Dec. 29, 1964  C. C. CONNELL  3,163,157
APPARATUS FOR COOLING AN INTERNAL COMBUSTION ENGINE
Filed Sept. 26, 1963  3 Sheets-Sheet 1

INVENTOR.
CALVIN C. CONNELL
BY
WILSON, SETTLE &
CRAIG
ATTORNEYS

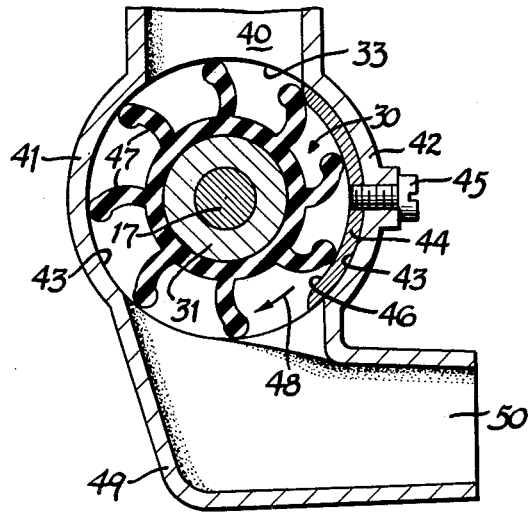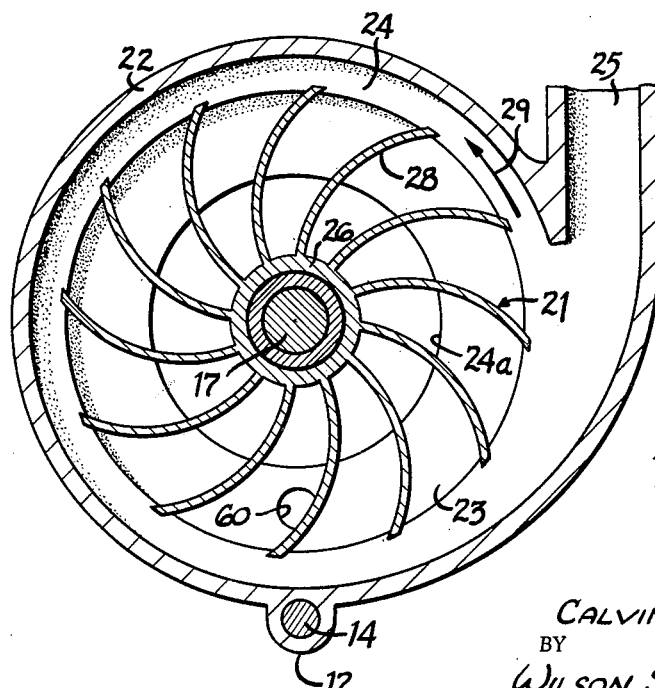

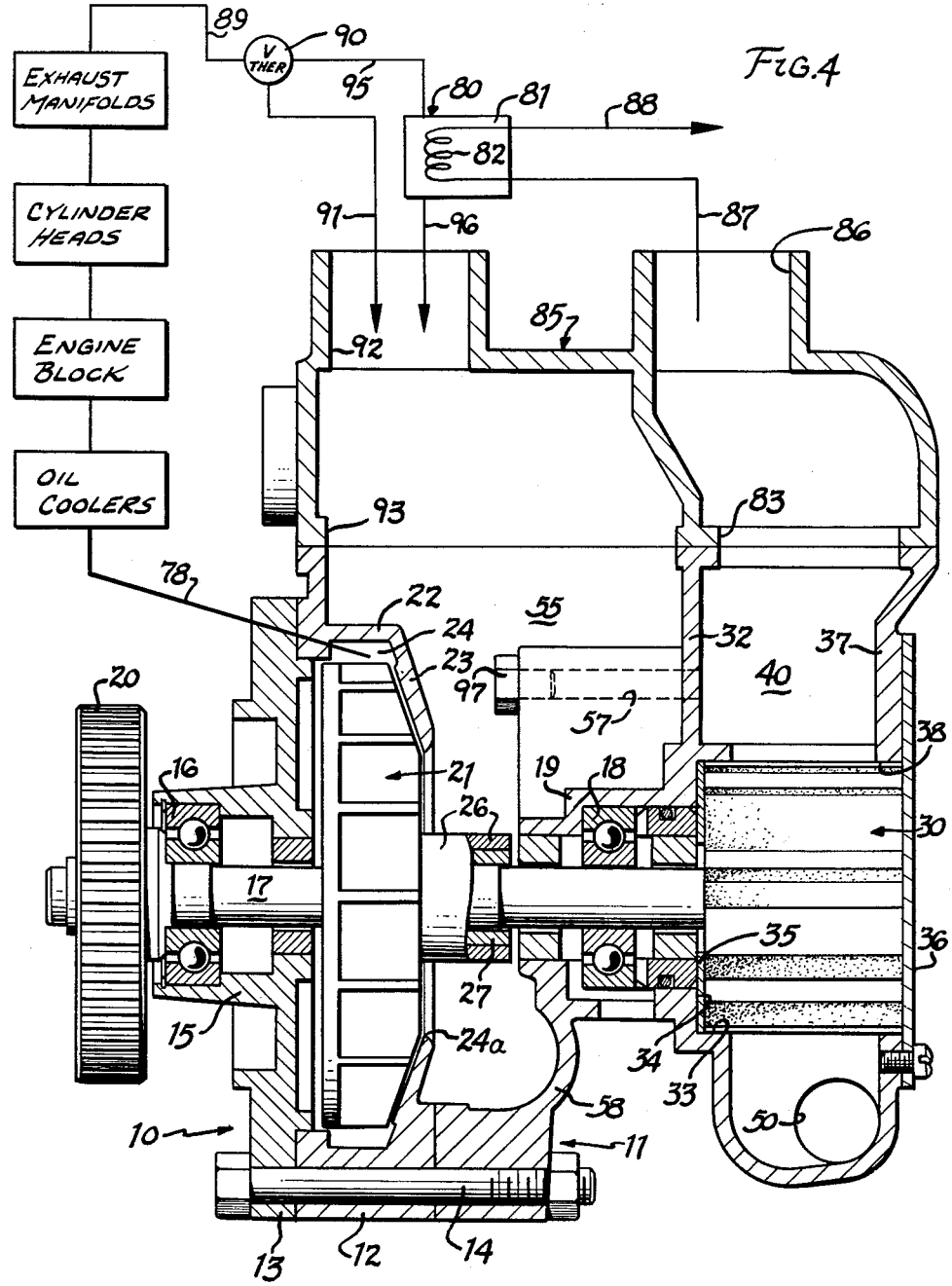

United States Patent Office 3,163,157
Patented Dec. 29, 1964

3,163,157
APPARATUS FOR COOLING AN INTERNAL
COMBUSTION ENGINE
Calvin C. Connell, Bloomfield Hills, Mich., assignor to Crusader Marine Corporation, Warren, Mich., a corporation of Michigan
Filed Sept. 26, 1963, Ser. No. 311,808
11 Claims. (Cl. 123—41.09)

The present invention relates to an apparatus for cooling an internal combustion engine and, more particularly, to an apparatus including a 2-stage pumping arrangement for supplying coolant to a marine engine in a novel and efficient manner, the apparatus being adaptable to utilize either raw water or fresh water as the coolant.

The cooling of an internal combustion engine of the marine type poses several problems not normally encountered in non-marine engines. For example, the coolant which is utilized can be either "raw water" or "fresh water," i.e., lake or river water where the boat is operating in non-salt water, or an independent and separate recirculatory fresh water supply where the boat is operating in salt water, respectively. Where "fresh water" coolant is utilized, the fresh water is cooled by circulation through a heat exchanger which is cooled by means of salt water pumped from the sea through the heat exchanger and pumped back into the sea. Where "raw water" coolant is utilized, water is merely pumped from the lake or river through the cooling system to be recirculated until such time as the water is heated to a greater than desired degree, the heated water then being dumped overboard to be replaced with fresh "raw water."

In order to adequately cool the marine engine, a two-stage water pump driven by the engine is utilized. One of these stages consists of a pump of a centrifugal type capable of delivering the high volumes of water necessary to properly scrub the internal passages of the internal combustion engine, to dissipate the heat and to maintain uniform temperatures throughout the engine. The second stage is a positive displacement pump utilized to provide a continuous source of make-up water in "raw water" cooling and providing a continuous source of heat exchange salt water in the case of fresh water cooling.

One novel feature of the present invention resides in a two-stage pumping arrangement wherein (1) the positive displacement pump can be sealed from the centrifugal pump, so that no sea water will enter the engine coolant passages when fresh water cooling is being utilized and (2) wherein the positive displacement pump is interconnected with the centrifugal pump to provide fresh raw water to the pump, so that the centrifugal pump is continuously primed when raw water cooling is used.

Additionally, the present invention provides means for supplying coolant to the engine in a novel, more efficient manner, the circulation of the water from the centrifugal pump being identical, no matter which cooling system is utilized. The coolant flows from the centrifugal pump, in turn, through the oil coolers, the engine block, the cylinder heads and the exhaust manifolds. In this manner, the coldest water available is utilized to maintain the desired oil temperature, while the hottest water passes through the exhaust manifolds. The temperature of the water from the exhaust manifolds is sensed, as by a thermostat, to determine whether the water should be recirculated.

All in all, the device of the present invention provides an improved coolant circulation apparatus for a marine engine capable of attaining and maintaining desirable coolant temperature, and further capable of presenting coolant of the desired temperature to the various portions of the engine requiring cooling.

It is, therefore, an important object of the present invention to provide a new and improved apparatus for cooling an internal combustion marine engine.

Another important object of the present invention is the provision of a two-stage pumping arrangement for circulating a coolant through a marine engine, and capable of being utilized to cool the engine with either "raw water" or "fresh water," dependent upon the conditions under which the engine is operating.

It is a further object of the present invention to provide a novel two-stage pumping arrangement for utilization in conjunction with a marine engine, the pumping arrangement including a centrifugal pump and a positive displacement pump sealed from one another, so that fresh water can be utilized in the engine and sea water can be utilized for cooling the circulating fresh water without the possibility of contamination of the fresh water by the sea water.

It is a further, and no less important, object of the present invention to provide a two-stage water pump arrangement for an internal combustion engine to circulate coolant water through the engine oil coolers, the engine block, the cylinder heads and finally through the exhaust manifolds before being re-introduced to the pump inlet, and utilizing thermostatic means responsive to the temperature of the water from the exhaust manifolds to determine whether or not the water should be recirculated.

Other objects of this invention will appear in the following description and appended claims, reference being had to the accompanying drawings forming a part of this specification wherein like reference characters designate corresponding parts in the several views.

On the drawings:

FIGURE 2 is a sectional view taken along the plane 2—2 of FIGURE 1;

FIGURE 3 is a sectional view, with parts shown in elevation, taken along the plane 3—3 of FIGURE 1; and FIGURE 4 is a view similar to FIGURE 1, but illustrating a modified embodiment of the present invention.

Figure 1:
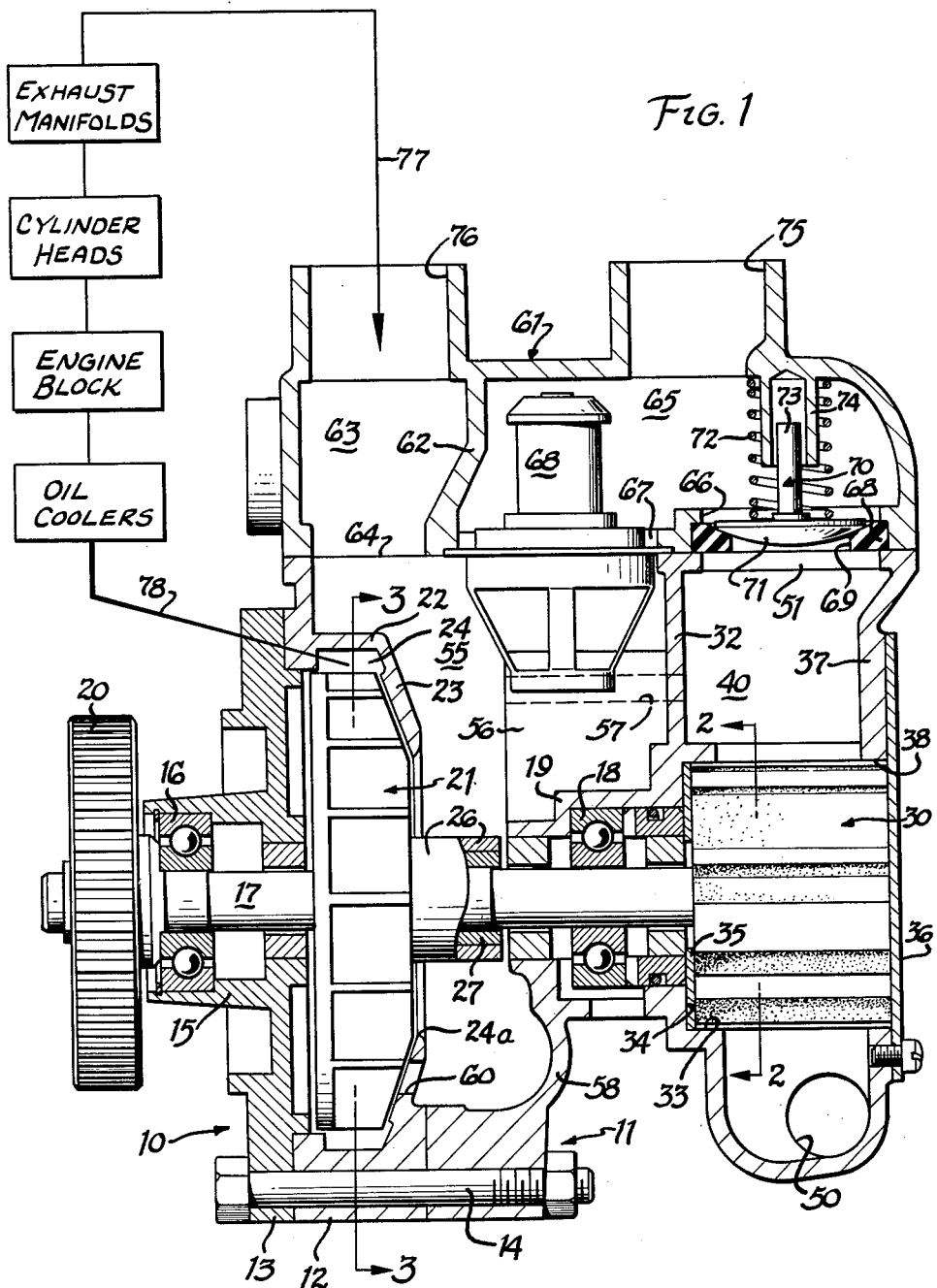
FIGURE 1 is a vertical sectional view, with parts shown in elevation, through a two-stage pumping arrangement of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 10 refers generally to an apparatus of the present invention for cooling an internal combustion engine (not shown) and comprising a main housing or body 11, a front plate 12 and a front cover plate 13, the body 11 and the plates 12 and 13 being secured together by suitable means, as by bolts 14.

The front plate 12 is provided with a central, laterally projecting embossment 15, providing a support for an internal ball bearing 16 supporting for rotation a drive shaft 17. The shaft 17 is supported in spaced relation to the bearing 16 by a second bearing 18 carried in an embossment 19 located internally of the main housing 11.

The shaft 17 is driven by a driving gear 20 which is keyed or otherwise secured to the shaft 17 to be driven by the internal combustion engine.

Mounted upon the shaft 17 for rotation therewith is a centrifugal pump including an impeller 21, best illustrated in FIGURE 3 of the drawings.

The centrifugal impeller 21 is surrounded by a scroll-shaped shroud 22 formed integrally with the front plate 12 and having an inwardly projecting annular flange 23 which is centrally apertured, as at 24a, to provide a central annular inlet concentric with the shaft 17. As best seen in FIGURE 3, the shroud 22 provides a helical outlet opening 24 which merges into a discharge port 25.

The impeller 21 is defined by an elongated hub section 26 positioned on a central, cylindrical sleeve 27 secured to the shaft. The impeller hub has secured thereto a plurality of arcuate, substantially radial vanes 28 which, upon rotation of the shaft 17 in a counterclockwise direction (as indicated in FIGURE 3 by directional arrow 29) will advance coolant, such as water, entering through the central inlet port 24a radially outwardly into the discharge path 24 and eventually through the discharge port 25.

Also mounted on the shaft 17 is a positive displacement pump including an impeller 30 formed of an elastomeric material, such as rubber, and secured to the shaft 17 by means of a cylindrical hub 31 (FIGURE 2). The impeller 30 is secured in place by means of a radial casing wall 32 having an annular shoulder 33 concentric with the shaft 17 and a radial abutment face 34 against which is positioned a wear plate 35 abutting one end face of the impeller 30. The impeller is secured in the casing by means of a rear cover plate 36 secured to a rear radial wall 37 of the casing apertured, as at 38, to peripherally surround the impeller 30.

A positive displacement pump chamber 40 defined between the radial casing walls 32 and 37 is closed at its transverse extremities by side walls 41 and 42 having arcuate interior surfaces 43 concentric about the shaft 17 (FIGURE 2). An arcuate deflection plate 44 is secured to the wall 42 by suitable means, as by bolts 45, the plate having an interior arcuate surface 46 against which the elastomeric vanes 47 of the impeller 30 are deflected from their normal, substantially radial configuration as the pump is rotated in the direction of directional arrow 48 (FIGURE 2).

The pump chamber 40 merges through side walls 49 into a lower pump inlet opening 50 adapted to receive raw water, such water being pumped substantially upwardly by the impeller 30 into the upper portion of the pump chamber 40 for exit through an outlet opening 51 defined between the side walls 32 and 37.

The positive displacement pump chamber 40 is isolated from the centrifugal pump inlet chamber 55 by the casing wall 32, this wall 32 being provided with a lateral embossment 56 projecting into the chamber 55 and having a generally cylindrical passage 57 interconnecting the chambers 40 and 55. The lower or sump portion of the centrifugal pump intake chamber 55 is provided by a separate main casing wall 58, and the shroud flange 23 is apertured, as at 60, for a purpose to be hereafter more fully described.

Superimposed on the main casing 11 is an upper cover plate 61 secured thereby by suitable means, as by bolts (not shown). This cover plate has an interior plate 62 dividing the cover plate into an inlet chamber 63 communicating freely through a port 64 with the centrifugal pump inlet chamber 55, and an outlet chamber 65 communicating through a first port 66 with the outlet port 51 for the positive displacement pump 30, and communicating through a second port 67 with the centrifugal pump inlet chamber 55.

Positioned in the port 67 is a thermostatically controlled valve assembly 68 capable of interconnecting the chambers 65 and 55 only when the water in the chamber 55 attains an elevated, predetermined temperature sufficient to actuate the thermostatic valve assembly. Positioned at the port 66 is an annular valve seat 68 having a central aperture 69 controlled by a pressure relief valve element indicated generally at 70. This pressure relief valve element 70 includes a radially enlarged head 71 abutting the valve seat 68 and urged thereagainst by means of a compression spring 72 bottomed against the cover plate 61. Movement of the head 71 is guided by a valve stem 73 surrounded by a guide embossment 74 formed integrally in the cover plate 61. The chamber 65 formed internally of the cover plate 61 communicates through a port 75 with an overboard exhaust line (not shown), while the chamber 63 communicates through a port 76 with a re-circulatory return line 77.

As schematically illustrated in FIGURE 1, the discharge opening 24 of the centrifugal pump 21 communicates through a conduit 78 with those portions of the engine requiring cooling, the line or conduit 78 leading successively to the oil coolers, the engine block, the cylinder heads, and the exhaust manifolds of the engine.

The operation of the apparatus of FIGURES 1 through 3 will be readily apparent to those skilled in the art.

The positive displacement pump 30 constantly pumps "raw water" from the line 50 into the chamber 40, such water under pressure opening the pressure relief valve 70 when the pressure in the chamber 40 attains a value sufficient to open the valve against the compressive force of the spring 72. Also, when the pressure in the chamber 40 is greater than the pressure in the chamber 55, raw water will be supplied to the chamber 55 through the passage 57. This water in the inlet chamber 55 will be circulated by the centrifugal pump 21, rotation of the pump impeller drawing the water through the intake opening 24a and displacing the water under pressure through the pump outlet port 25 into the conduit 78.

This water is supplied initially to the oil coolers, the coldest water available thus being supplied to the oil coolers so as to maintain the desired oil temperature. The water from the oil coolers and heated somewhat thereby then passes through the engine block up into the cylinder heads, and from the cylinder heads back through the exhaust manifolds to be discharged through the conduit 77 into the intake port 76.

The utilization of this water previously warmed by the oil coolers, the engine block and the cylinder heads for cooling the exhaust manifolds is of extreme importance. Where water at the temperature of the raw water is utilized, as is conventional in the art, this water may be as cold as 40 degrees, even in the summer. This cold water causes the exhaust manifolds to sweat internally and the resultant moisture condensing upon the internal walls of the exhaust manifolds can, under constant low speed operation, run into the exhaust ports of the engine, fouling out the cylinder and, in many cases, causing a hydrostatic block. By utilizing the previously warmed water for circulation through the exhaust manifolds, any such condensation is avoided while at the same time the exhaust manifolds are cooled to a desired extent.

Water entering the intake chamber 55 through the line 77 circulates in and about the thermostatic control for the thermostatic valve 68. If the water is at a relatively low temperature, insufficient to actuate the thermostatic valve 68, the water is then recirculated through the centrifugal pump intake opening 24 through the complete circuit, including the oil coolers, the engine block, the cylinder heads and the exhaust manifolds.

However, if the water is at a temperature sufficient to actuate the thermostatic valve 68, the valve opens and the hot water is exhausted through the valve and into the overside dumping port 75. Fresh make-up water is then supplied from the chamber 40 through the passage 57 since the pressure in the intake chamber 55 will then be less than the pressure in the chamber 40.

It will be seen that the invention provides, in the embodiments of FIGURES 1 through 3, a raw water cooling system in which the positive displacement pump 30 provides a constant source of raw water for the centrifugal pump 21, thus insuring that the pump 21 is always primed. The utilization of the thermostatic control valve 68 insures the maintenance of the desired temperatures in the complete circulatory system serviced by the centrifugal pump. The provision of the embossment 56, within which the port 57 is located, prevents any interference with the function of the thermostatic control valve 68 by the cold raw water introduced into the chamber 55.

The port 60 provided in the shroud flange 23 serves an important function. When the apparatus is utilized in raw water cooling, silt, sand and foreign matter may well be so co-mingled with the raw water supplied from the chamber 40 that such material will enter the pump intake chamber 55. To prevent this foreign matter from settling in the lower part of the inlet chamber 55, the bypass hole will vent some of the pressure from the centrifugal pump and force water through the aperture 60 into the lower chamber at the suction side of the pump. Thus, the foreign matter will be retained in suspension and circulated by the normal operation of the centrifugal pump until it is eventually dumped overboard through the port 75. In this manner, such foreign matter is always kept in suspension and in circulation, and there is no opportunity afforded for the foreign matter to attain such a level in the intake chamber 55 as to block the pump intake opening 24 or to otherwise interfere with the operation of the apparatus.

In that embodiment of the invention illustrated in FIGURE 4 of the drawings, identical reference numerals refer to identical portions of the apparatus. It will be noted that the embodiment of FIGURE 4 is suitable for fresh water cooling, i.e., the system wherein fresh water is continuously circulated through the oil coolers, the engine block, the cylinder heads and the exhaust manifolds by the centrifugal pump 21. This water is cooled when necessary by means of a heat exchanger circuit indicated generally at 80 by the utilization of raw sea water circulated by the positive displacement pump 30. Circuit 80 is connected in parallel with that portion of the normal recirculatory flow path constituted by a conduit 91, and a thermostatically controlled valve 90 operates to selectively divert coolant from conduit 89 into conduit 91 or into the heat exchange circuit 80 in accordance with the temperature of the coolant.

More specifically, the heat exchanger circuit 80 comprises a casing defining a heat exchange chamber 81 enclosing a heat exchange coil 82. This coil 82 receives raw water from the positive displacement pump 30 by means of an exhaust port 83 formed internally of a modified pump cover plate 85, the raw water being discharged through a top cover plate exhaust port 86 and conduit 87, into the coil 82. Water from the coil 82 is discharged overboard through an exhaust line 88. Fresh water from the centrifugal pump 21 is circulated through the oil coolers, the engine block, the cylinder heads and the exhaust manifolds for passage through a return line 89 to a thermostatically controlled bypass valve indicated schematically at 90. This valve 90 normally returns fresh water from the conduit 89 through conduit 91 into an intake port 92 formed in the top cover plate 85 and communicating freely, as through openings 93, with the intake chamber 55 of the pump 21.

When the return water in the line 89 exceeds a predetermined temperature, the thermostatic bypass valve 90 is actuated, so that the hot water is circulated through a by-pass conduit 95 into the heat exchanger chamber 81 for cooling by the raw water flowing through the heat exchanger coil 82, the cooled water flowing from the casing 81 through line 96 and the port 92 into the centrifugal pump intake chamber 55.

In this embodiment of the invention, the constant displacement pump chamber 40 is completely isolated from the centrifugal pump intake chamber 55 by the wall 32, the passage 57 being closed by a suitable means, such as a drive plug 97. Further, since the completely isolated fresh water circulated by the centrifugal pump will not pick up any silt, sand or other foreign matter, it is not necessary to aperture the shroud flange 23, as was described in conjunction with FIGURE 1.

Thus, the basic apparatus, including the two-stage pump assembly, can be very readily adapted to fresh water cooling in which raw sea water is completely divorced from the circulatory fresh water utilized in cooling the engine.

While an exemplary embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. In an apparatus for supplying liquid coolant to the cooling system of an internal combustion engine, a dual pump arrangement comprising a centrifugal pump, a positive displacement pump, means for driving said pumps, means defining a recirculatory flow path through which the output of said centrifugal pump is normally circulated to cool said engine, said flow path successively including the engine oil coolers, engine block, cylinder heads and exhaust manifolds, thermostatic means located in said flow path between said manifolds and the intake of said centrifugal pump and responsive to the temperature of said coolant flowing from said exhaust manifolds for diverting the coolant from said recirculatory flow path when the temperature of said coolant exceeds a predetermined temperature, and means directly responsive to the diversion of coolant by said thermostatic means for utilizing the output of said positive displacement pump to cool said coolant.

2. An apparatus as defined in claim 1, wherein said thermostatic means vents the coolant to exhaust and the last mentioned means includes a passage interconnecting the output of said positive displacement pump and the intake of said centrifugal pump to supply additional make-up coolant from said positive displacement pump.

3. In an apparatus for supplying raw water to the cooling system of an internal combustion engine, a dual pump arrangement comprising a centrifugal pump, a positive displacement pump, means for driving said pumps, means defining a recirculatory flow path through which the output water of said centrifugal pump is normally circulated to cool said engine, thermostatic means responsive to the temperature of water in said flow path for diverting the water to exhaust when the temperature thereof exceeds a predetermined temperature, a pressure relief valve establishing a predetermined minimum pressure at which make-up water is supplied by said positive displacement pump, and means venting the make-up at said minimum pressure into said recirculatory flow path to replenish water exhausted therefrom.

4. In an apparatus for supplying liquid coolant to a cooling system of an internal combustion engine, a dual pump arrangement comprising a centrifugal pump, a positive displacement pump, means for driving said pumps, a heat exchanger coil in constant communication with the positive displacement pump to receive coolant therefrom, means defining a normal recirculatory flow path through which the coolant from said centrifugal pump is normally circulated to cool said engine, means defining a heat exchange circuit connected in parallel with a portion of said normal flow path, said circuit including a casing defining a heat exchange chamber surrounding a heat exchanger coil, and thermostatic means responsive to the temperature of said coolant in said flow path for diverting the flow of coolant from said portion of said normal flow path to said heat exchange circuit whenever the recirculating coolant in said recirculatory flow path is at a temperature exceeding a predetermined temperature.

5. In an apparatus for supplying raw water to the cooling system of an internal combustion engine, a dual pump arrangement comprising a centrifugal pump, a positive displacement pump, means for driving said pumps, means defining a flow path through which the output water of said centrifugal pump is circulated to cool said engine, means connecting the output water of said positive displacement pump with the intake of said centrifugal pump to supply raw water thereto, and means for venting a portion of the output of said centrifugal pump through the intake thereof to maintain in suspension any sediment in the raw water supplied thereto by said positive displacement pump.

6. In an apparatus for supplying liquid coolant to the cooling system of an internal combustion engine, the apparatus being utilizable alternatively for fresh water and raw water cooling of the engine, a dual pump arrangement comprising a centrifugal pump, a positive displacement pump, means for driving said pumps, means defining a recirculatory flow path through which the output water of said centrifugal pump is normally circulated to cool said engine, thermostatic means responsive to the temperature of said output water for diverting the output of said centrifugal pump from its normal recirculatory flow path whenever the temperature of the coolant exceeds a predetermined temperature, means normally interconnecting the output of the positive displacement pump and the intake of the centrifugal pump to accommodate the supplying of raw water to the centrifugal pump whenever said thermostatic means diverts the output of said centrifugal pump, and means for completely isolating the output of said positive displacement pump and the intake of said centrifugal pump whenever fresh water cooling is desired.

7. In an apparatus for supplying liquid coolant to the cooling system of an internal combustion engine, the apparatus being utilizable for either fresh water or raw water cooling of the engine, a dual pump arrangement comprising a centrifugal pump, a positive displacement pump, means for driving said pumps, means defining a recirculatory flow path through which the output of said centrifugal pump is normally circulated to cool said engine, thermostatic means responsive to the temperature of said coolant for diverting the output of said centrifugal pump from its normal recirculatory flow path whenever the temperature of the coolant exceeds a predetermined temperature, means defining a passage normally interconnecting said positive displacement pump and said centrifugal pump to accommodate the supplying of raw water to the centrifugal pump whenever said thermostatic means diverts the output of said centrifugal pump, and means for blocking said passage to completely isolate said positive displacement pump from said centrifugal pump whenever fresh water cooling is desired.

8. In an apparatus for supplying raw water to the cooling system of an internal combustion engine, a dual pump arrangement comprising a centrifugal pump, a positive displacement pump, a casing surrounding both of said pumps, means for driving said pumps, means defining a flow path through which water from said centrifugal pump is circulated to cool said engine, a chamber in said casing interconnecting said positive displacement pump and said centrifugal pump to supply priming water thereto, and means for introducing into said chamber a portion of the water from said centrifugal pump to maintain in suspension any sediment in the raw water in said chamber.

9. In an apparatus for supplying raw water to the cooling system of an internal combustion engine, a dual pump arrangement comprising a centrifugal pump, a positive displacement pump, means for driving said pumps, means defining a recirculatory flow path through which raw water from said centrifugal pump is normally circulated to cool said engine, thermostatic means responsive to the temperature of said raw water for diverting the output of said positive displacement pump to exhaust when the temperature of said water exceeds a predetermined temperature, a pressure relief valve establishing a predetermined minimum pressure at which make-up raw water is supplied by said positive displacement pump, and means interconnecting the output of said positive displacement pump and the intake of said centrifugal pump to supply to said intake make-up water at said pressures.

10. Apparatus as defined in claim 1 further comprising means defining a heat exchange chamber connected in parallel with a portion of said recirculatory flow path, said thermostatic means comprising a thermostatically responsive valve normally operable to direct coolant through said portion of said flow path and operable when the temperature of coolant flowing from said exhaust manifolds exceeds a predetermined temperature to divert coolant from said portion of said path to flow through said heat exchange chamber, said means for utilizing the output of said positive displacement pump comprising a heat exchange coil located within said heat exchange chamber and hydraulically connected to the outlet of said positive displacement pump.

11. A marine engine cooling system comprising a raw water intake pump, means defining a recirculatory flow path including a first chamber through which water is circulated to cool said engine, a recirculating pump connected in said flow path with its intake in communication with said first chamber to pump water through said recirculatory flow path, means for continuously driving both of said pumps, means defining an outlet chamber having a first inlet port in communication with the outlet of said intake pump and a second inlet port in communication with said first chamber, pressure responsive valve means at first inlet port for placing the outlet of said intake pump in communication with said outlet chamber when the pressure at the outlet of said intake pump exceeds a predetermined pressure, thermostatically controlled valve means at said second port for connecting said first chamber to said outlet chamber when the temperature of water in said recirculatory flow path exceeds a predetermined temperature, and means defining a passage placing the outlet of said intake pump in constant free and open communication with said first chamber.

References Cited by the Examiner
UNITED STATES PATENTS

| | | | |
|---|---|---|---|
| 2,377,028 | 5/45 | Nicholas | 123—41.09 |
| 3,105,472 | 10/63 | Jasper | 123—41.08 |

RICHARD B. WILKINSON, *Primary Examiner.*
KARL J. ALBRECHT, *Examiner.*